(12) United States Patent
Wang

(10) Patent No.: US 8,823,495 B2
(45) Date of Patent: Sep. 2, 2014

(54) SIGHT SPOT GUIDING SYSTEM AND IMPLEMENTATION METHOD THEREOF

(75) Inventor: Senhu Wang, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/258,019

(22) PCT Filed: Jul. 19, 2010

(86) PCT No.: PCT/CN2010/075253
§ 371 (c)(1),
(2), (4) Date: May 3, 2012

(87) PCT Pub. No.: WO2011/109980
PCT Pub. Date: Sep. 15, 2011

(65) Prior Publication Data
US 2013/0038427 A1 Feb. 14, 2013

(30) Foreign Application Priority Data
Mar. 12, 2010 (CN) .......................... 2010 1 0133030

(51) Int. Cl.
*H04Q 5/22* (2006.01)
*G08C 19/12* (2006.01)
*G08B 1/08* (2006.01)
*G06K 17/00* (2006.01)

(52) U.S. Cl.
CPC ............... *G06K 30/02* (2013.01); *G06K 17/00* (2013.01)
USPC .................... 340/10.1; 340/10.41; 340/10.52; 340/13.26; 340/539.11; 340/539.13

(58) Field of Classification Search
CPC ......... G06K 7/01; G06K 15/00; G08B 13/14; G08B 1/08; H04Q 5/22; H04Q 7/20; G05B 19/00; G06F 17/00
See application file for complete search history.

(56) References Cited

U.S. PATENT DOCUMENTS 6,070,207 A * 5/2000 Bell .............................. 710/302
6,401,013 B1 * 6/2002 McElreath ........................ 701/3

(Continued)

FOREIGN PATENT DOCUMENTS

CN 1702663 A 11/2005
CN 101150807 A 3/2008

(Continued)

OTHER PUBLICATIONS

International Search Report for PCT/CN2010/075253 dated Oct. 26, 2010.

*Primary Examiner* — Jennifer Mehmood
*Assistant Examiner* — John Mortell
(74) *Attorney, Agent, or Firm* — Stephen Yang; Ling Wu; Ling and Yang Intellectual Property

(57) ABSTRACT

A sight spot guiding system and an implementing method thereof are provided. The method includes: a mobile terminal equipped with an RFID chip, after arriving at the sight spot, receiving a radio broadcast signal transmitted by an RFID reader set at the sight spot, and transmitting a radio response signal which carriers the ID of the present RFID chip; the RFID reader reading the radio response signal and then reporting the IDs of the RFID chip and the reader to an administration center, which, after receiving the IDs of the RFID and the reader, sends sight spot description information corresponding to the ID of the reader to the mobile terminal corresponding to the ID of the RFID chip, according to corresponding relationships between IDs of RFID readers and sight spot description information and between IDs of RFID chips and mobile terminals.

7 Claims, 3 Drawing Sheets

(56) References Cited

U.S. PATENT DOCUMENTS

| | | | |
|---|---|---|---|
| 6,701,227 B2* | 3/2004 | McConnell | 701/3 |
| 7,313,644 B2* | 12/2007 | Ryan | 710/315 |
| 2003/0197612 A1* | 10/2003 | Tanaka et al. | 340/572.1 |
| 2004/0114609 A1* | 6/2004 | Swarbrick et al. | 370/400 |
| 2007/0290802 A1* | 12/2007 | Batra et al. | 340/10.1 |
| 2007/0296572 A1* | 12/2007 | Fein et al. | 340/539.13 |
| 2009/0231110 A1* | 9/2009 | Hyde et al. | 340/10.41 |

FOREIGN PATENT DOCUMENTS

| | | |
|---|---|---|
| CN | 201274483 Y | 7/2009 |
| CN | 201378412 Y | 1/2010 |
| KR | 10-2008-0012481 A | 2/2008 |
| KR | 20080012481 A | 2/2008 |
| KR | 10-2009-0028180 A | 3/2009 |
| KR | 20090028180 A | 3/2009 |
| WO | 2004008343 A1 | 1/2004 |
| WO | 2006011121 A1 | 2/2006 |

* cited by examiner

SIGHT SPOT GUIDING SYSTEM AND IMPLEMENTATION METHOD THEREOF

TECHNICAL FIELD

The present invention relates to the technical field of Radio Frequency Identification (RFID), and particularly to a sight spot guiding system and an implementation method thereof.

BACKGROUND OF THE RELATED ART

The RFID technology is a technology for identifying a specific target and reading related data by a radio broadcast signal. Generally an RFID system includes two types of basic devices, and is composed of an interrogator (or a reader) or a plurality of responders (or labels). The RFID technology relates to high-tech fields such as information, manufacture, materials and so on, and are mostly used for controlling, detecting and tracking objects. At present the RFID technology is widely applied in fields of supermarket, library management, traffic and transportation management, electronic purse, electronic cards, and so on.

The current sight spot guiding system adopts a variety of high-tech ways. For example, a playing apparatus is stalled in front of the sight spot, to display sight spot description information in sound and images in a loop. However, the disadvantage of this way is that tourists need to gather in front of the playing apparatus, and the sound may be relatively noisy, and the played image can not be seen clearly in greater distance. Currently, there also exist some hand-held sight spot guiding apparatuses, which may play sight spot description information when a sight spot number is entered, the disadvantage of which is as follows: it is inconvenient to view the sight spot description information when there are two many tourists, the sight spot description information is difficult to update in real time, and there is few interactions between the sight spot administration center and tourists.

SUMMARY OF THE INVENTION

The technical problem the present invention solves is to provide a sight spot guiding system and an implementation method thereof, to implement sight spot guiding and management by an RFID technology.

In order to solve the above problem, the present invention provides a sight spot guiding system, which comprises: a radio frequency identification (RFID) chip, an RFID reader and an administration center, wherein the RFID chip is installed in a mobile terminal, the RFID reader is set at each sight spot of a scenery spot, the RFID chip and the RFID reader are both configured with a unique identity identifier (ID), wherein, the RFID chip is configured to: after arriving at the sight spot, receive a radio broadcast signal transmitted by the RFID reader set at the sight spot, and transmit a radio response signal which carries the ID of the RFID chip;

the RFID reader is configured to: after reading the radio response signal transmitted by the RFID chip, report the ID of the RFID chip and the ID of the reader itself to the administration center;

the administration center is configured to: store a corresponding relationship between the ID of the RFID reader and sight spot description information, and a corresponding relationship between the RFID chip and the mobile terminal; after receiving the reported ID of the RFID chip and ID of the reader, send the sight spot description information corresponding to the ID of the reader to a mobile terminal corresponding to the ID of the RFID chip by a mobile communication network.

The administration center is further configured to:
store and maintain a sight spot information table and a reader table respectively, wherein the sight spot information table stores a corresponding relationship between the ID of each sight spot and description information of the sight spot, and the reader table stores a corresponding relationship between the ID of each RFID reader and an ID of the sight spot at which the RFID reader is located;

after receiving the ID of the RFID chip and the ID of the RFID reader that are reported, obtain the ID of the sight spot corresponding to the ID of the RFID reader by querying the reader table, and then obtain the sight spot description information corresponding to the ID of the sight spot by querying the sight spot information table.

The administration center is further configured to:
store and maintain a label table which stores a corresponding relationship between the ID of the RFID chip, a number of the mobile terminal and the ID of the current sight spot; and store and maintain, for each RFID chip, a visited sight spot table which stores the ID of a sight spot visited by the RFID chip;

when receiving the ID of the RFID chip and the ID of the RFID reader that are reported, obtain the ID of the current sight spot corresponding to the ID of the RFID chip by querying the label table, and if the obtained ID of the sight spot corresponding to the ID of the RFID reader is not identical with the ID of the current sight spot corresponding to the ID of the RFID chip, then update the ID of the current sight spot in the label table with the ID of the sight spot corresponding to the ID of the RFID reader, meanwhile query the visited sight spot table to judge whether there is the updated ID of the sight spot, if not, send the sight spot description information corresponding to the updated ID of the sight spot to the mobile terminal corresponding to the RFID chip by querying the sight spot table, and then record the updated sight spot ID into the visited sight spot table.

The system further comprises an RFID calibrator which is configured to: calibrate the RFID chip and configure a unique ID for each RFID chip, and configure a radio frequency calibration parameter.

The RFID reader connects with the administration center by a wired device or a wireless device, and the RFID reader is configured to: after reading the radio response signal transmitted by the RFID chip, report the ID of the RFID chip and the ID of the current reader to the administration center by sending a report request to the administration center.

The present invention also provides a method for implementing sight spot guiding, comprising:

after a mobile terminal equipped with a radio frequency identification (RFID) chip arrives at a sight spot, receiving a radio broadcast signal transmitted by an RFID reader set at the sight spot, and transmitting a radio response signal which carriers an Identity Identifier (ID) of the current RFID chip;

the RFID reader, after reading the radio response signal transmitted by the RFID chip, reporting the ID of the RFID chip and the ID of the current reader to an administration center; and the administration center, after receiving the reported ID of the RFID chip and the ID of the reader, sending sight spot description information corresponding to the ID of the reader to the mobile terminal corresponding to the ID of the RFID chip by a mobile communication network, according to a stored corresponding relationship between the ID of the RFID reader and the sight spot description information and a stored corresponding relationship between the RFID chip and the mobile terminal.

The above method further comprises: the administration center storing and maintaining a sight spot information table and a reader table respectively, wherein the sight spot information table stores a corresponding relationship between the ID of each sight spot and description information of the sight spot, and the reader table stores a corresponding relation ship between the ID of each RFID reader and the ID of the sight spot at which the RFID reader is located;

the administration center, when receiving the ID of the RFID chip and the ID of the RFID reader, obtaining the ID of the sight spot corresponding to the ID of the RFID reader by querying the reader table, and then obtain the sight spot description information corresponding to the ID of the sight spot by querying the sight spot information table.

The above method further comprises:
the administration center storing and maintaining a label table which stores a corresponding relationship between the ID of the RFID chip, a number of the mobile terminal number and the ID of the current sight spot; and storing and maintaining, for each RFID chip, a visited sight spot table, which stores the ID of a sight spot visited by the RFID chip;

when receiving the ID of the RFID chip and the ID of the RFID reader that are reported, the administration center obtaining the ID of the sight spot corresponding to the ID of the RFID reader by querying the reader table, and obtaining the ID of the current sight spot corresponding to the ID of the RFID chip by querying the label table, and if the obtained IDs of the two sight spots are not identical, then updating the ID of the current sight spot in the label table with the ID of the sight spot corresponding to the ID of the RFID reader, and meanwhile querying the visited sight spot table to judge whether there is the updated ID of the sight spot, if not, sending the sight spot description information corresponding to the updated ID of the sight spot to the mobile terminal corresponding to the RFID chip by querying the sight spot table, and then recording the updated sight spot ID into the visited sight spot table.

The administration center sends the sight spot description information to the mobile terminal corresponding to the RFID chip by way of a short message or a multimedia message.

In the reader table, the ID of one sight spot corresponds to the ID of one RFID reader or IDs of more RFID readers.

Compared with the existing technology, the present invention has the following beneficial effects:

A hand-held sight spot guiding system is designed by using the RFID technology, to provide sight spot description information for tourists in time, so that the tourists may view the sight spot description information conveniently;

The sight spot description information may be updated in real time, and interactions between the sight administration center and tourists may also be implemented;

Moreover, the administration center may also know distribution condition of the tourists in real time by querying data base, and understand the tourists' preferences and concerns for different sight spots according to the distribution condition of the tourists, and take some management measures correspondingly, for example, to set more rest points at the sight spots that catch more attentions, and to reinforce propaganda and construction of the sight spots that have less attentions; in the case that the tourists are too centralized, guiding information may be released in time to avoid excessive centralization of the tourists, and so on.

PREFERRED EMBODIMENTS OF THE PRESENT INVENTION

Figure 1:
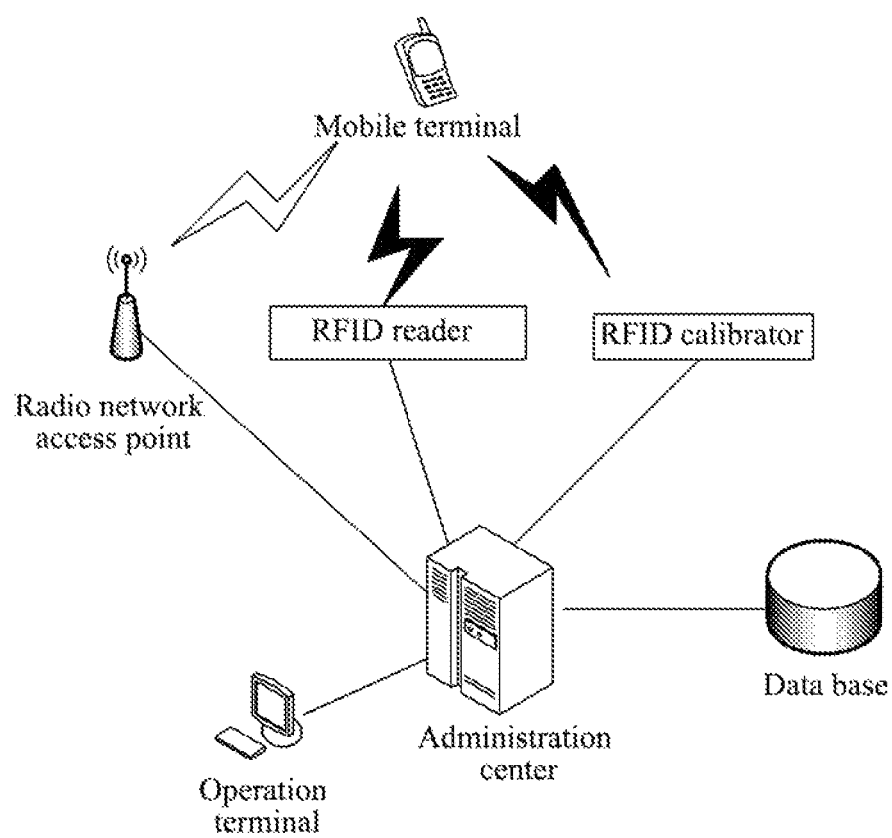
FIG. 1 is a composition schematic diagram of a sight spot guiding system provided by an embodiment of the present invention.

As shown in FIG. 1, a sight spot guiding system provided by an embodiment of the present invention mainly comprises the following modules:

an RFID label, i.e., an RFID chip, which is installed in a mobile terminal, and is used to receive a radio broadcast signal transmitted by an RFID reader, and transmit a radio response signal which carries the ID of the RFID label itself.

An RFID reader (also called as a reader for short below), each of the RFID reader has a unique ID and is fixed at each sight spot, each RFID reader connects with an administration center by a wired device or a wireless device. After reading a radio response signal of the RFID label, the RFID reader reports the ID of the RFID label and its own ID to the administration center, for example, reports them to the administration center by way of sending a report request.

An RFID calibrator, which is used to calibrate the RFID label in the mobile terminal in advance, and set a unique label ID of each RFID label, and configure a radio calibration parameter, and so on.

An administration center, which is used store a corresponding relationship between the ID in the RFID label and the number of the terminal number, and a corresponding relationship between the ID of the RFID reader and the sight spot description information and so on, and send the corresponding sight spot description information to the mobile terminal by a mobile communication network (the radio network access point in the figure, for example) after receiving the request message reported by the reader. The administration center further comprises an operation terminal device, which is used to enter data into a data base.

A mobile terminal device such as a mobile phone, which is used to install an RFID chip.

Wherein the RFID chip is prepared for a tourist, and will be installed in a mobile phone after the tourist arrives at a sight spot. When the tourist enters the sight spot, there are two tasks needing to be finished: 1. calibrating the RFID chip; 2. setting the corresponding relationship between the ID of the RFID chip and the mobile phone number into the data base.

RFID readers are installed in various sight spots, the RFID readers transmit a radio broadcast signal constantly. When a tourist moves into a sight spot, the hand-held RFID label receives the radio broadcast signal transmitted by a certain RFID reader and then transmits a radio response signal, and sends the ID of the RFID label to the reader by the response signal. The RFID reader of the sight spot reports the ID of the label and the ID of the reader to the administration center after receiving the response signal transmitted by the RFID label.

The administration center sends the description information of the sight spot to the mobile terminal held by the tourist by way of a short (multimedia) message after receiving the reported information.

Moreover, the administration center may also know a general distribution condition of the tourists according the reported information, and can guide the tourists in time during tourist season, to prevent the tourists from gathering at a few sight spots.

The mobile terminal in the above scheme relates to two types of radio communication modes:

the first mode, the communication between the mobile terminal and the mobile communication network access base station adopts a 2G/3G mobile communication network standard;

the second mode, the radio communication between the RFID label in the mobile terminal and the RFID reader uses an RFID technology standard.

In the above scheme, the working distance between the RFID label and the RFID reader is 0-80 m, and the working frequency is 2.4 GHz.

The deployment and preparation before the implementation of the sight spot guiding system provided by the present invention mainly relate to the following content:

1) the reader ID of each sight spot is set, wherein the reader ID of each sight spot is kept to be unique;

For example, each reader ID may be set by a dial switch.

In the case of a larger sight spot, setting multiple readers, which are disposed at different entry points, at a sight spot can be considered.

When RFID readers are set between adjacent sight spots, the RFID readers should keep apart from each other with certain distance, and the signal transmitting distance of the readers should be regulated to avoid mutual interference.

Figure 2:
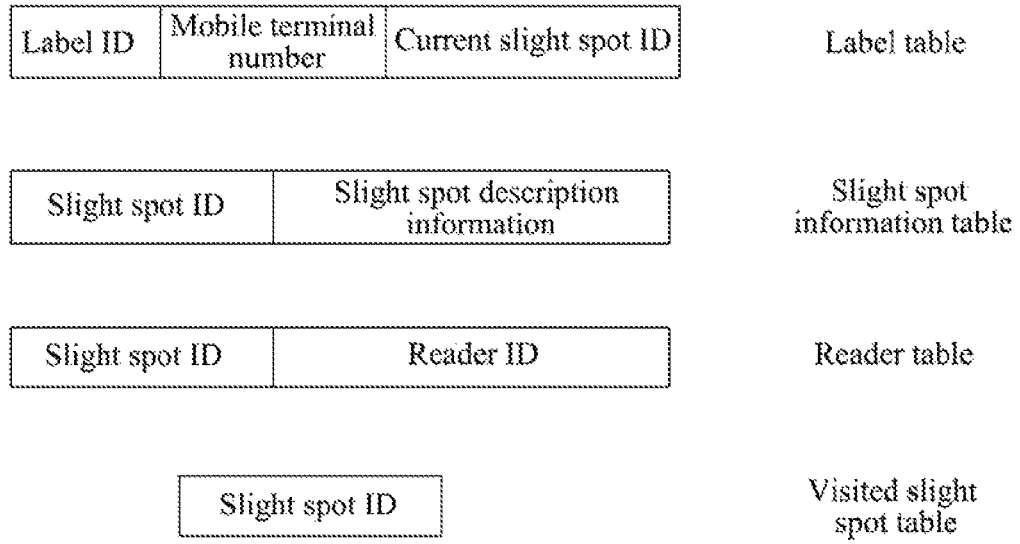
FIG. 2 is a schematic diagram of a data base table stored in an administration center according to an embodiment of the present invention.

2) the following data base tables may be stored in the backstage data base table of the administration center, as shown in FIG. 2, and each data base table is updated in real time by the administration center:

a sight spot information table (ViewPoint_Table), which is used to store the corresponding relationship between the ID of each sight spot (ViewPoint_ID) and the description information of the sight spot (ViewPoint_Desc), each piece of the records in the table corresponding to the information of a sight spot;

a reader table (Reader_ViewPoint_Table), which is used to store the corresponding relationship between the ID of each reader (Reader_ID) and the ID of the sight spot at which the reader is located (ViewPoint_ID), where it is allowed that IDs of multiple readers correspond to the ID of one sight spot, and for the IDs of multiple readers of the ID of the same sight spot the sight spot information is same.

3) an RFID calibration is performed when a tourist enters a sight spot, i.e., the RFID label obtains configuration parameters (such as transmitting power, frequency, and so on) and label ID from the calibrator and stores them; the calibrator, after finishing the matching of the label ID with the user mobile phone number, transmits them to the administration center, the administration center will store in the backstage data base table a label table (Label_Table), which is used to store the label ID, the corresponding relationship between the mobile terminal number (MobilePhone) and the ID of the current sight spot (Cur_Viewpoint_ID), and update the ID of the current sight spot in the Label_table with the entrance ID of the sight spot;

4) a data base table of visited sight spots, i.e., a visited sight spot table (LabelXXX_Viewpoint_Table), is established for each label ID, wherein LabelXXX is a certain label ID, and if the table has been established, the record is emptied, and then the entrance ID of the sight spot is recorded into the visited sight spot table.

Wherein, the LabelXXX_Viewpoint_Table is established at the same time as the Lable_Table is stored, for example, after the calibration of the RFID label at the entrance of the sight spot is finished, the LabelXXX_Viewpoint_Table is established at the same time as the label ID and the mobile phone number are updated in the Label_Table, and the entrance ID of the sight spot is recorded into the table.

The working process of the sight spot guiding system provided by the present invention will be further described as follows.

1. the RFID readers installed at each sight spot transmits radio broadcast signals constantly;

when a tourist moves to a sight spot, the RFID label in the mobile phone held by the tourist receives a radio broadcast signal transmitted by a certain reader, and transmits a radio response signal to the reader and transmits the label ID to the RFID reader. The RFID reader receives the radio response signal and parses out the ID reported by the label, and sends the ID of the reader and the ID of the RFID label to the administration center.

2. the administration center parses out the ID of the reader and the label ID in the request reported by the reader, and obtains the ID information of the sight spot (New_ID) from the data base table Reader_ViewPoint_Table according to the ID of the reader, and obtains the ID of the current sight spot (Cur_ID) and the mobile phone number from the data base table Label_tabel according to the label ID, and if the obtained two sight spot IDs are identical, it suggests that the tourist did not leave the sight spot, but maybe move from a signal range of a reader to a signal range of another reader, therefore there is no need to transmit the sight spot information to the user again. If the obtained two sight spot IDs are not identical, it means that the tourist entered a new sight spot, then the reported sight spot ID (New_ID) is updated to the current sight spot ID. Then the administration center queries the table LabelXXX_Viewpoint_Table to determine whether there is the sight spot ID (New_ID), if yes, it suggests that the user has been to this sight spot, and returns without any processing; if not, records the New_ID into the table LabelXXX_Viewpoint_Table, and queries the ViewPoint-_Table according to the New_ID, and obtains the sight spot description information therefrom and sends it to the mobile phone of the tourist. Besides the sight description information, the administration center may also transmit other various notification messages to the tourist.

3. the tourist may know the condition of the sight spot and various notifications transmitted by the administration center by reading the information transmitted by the administration center by a mobile phone.

Implementations of the technical schemes of the present invention will be further described in detail in combination with drawings and specific embodiments.

Figure 3:
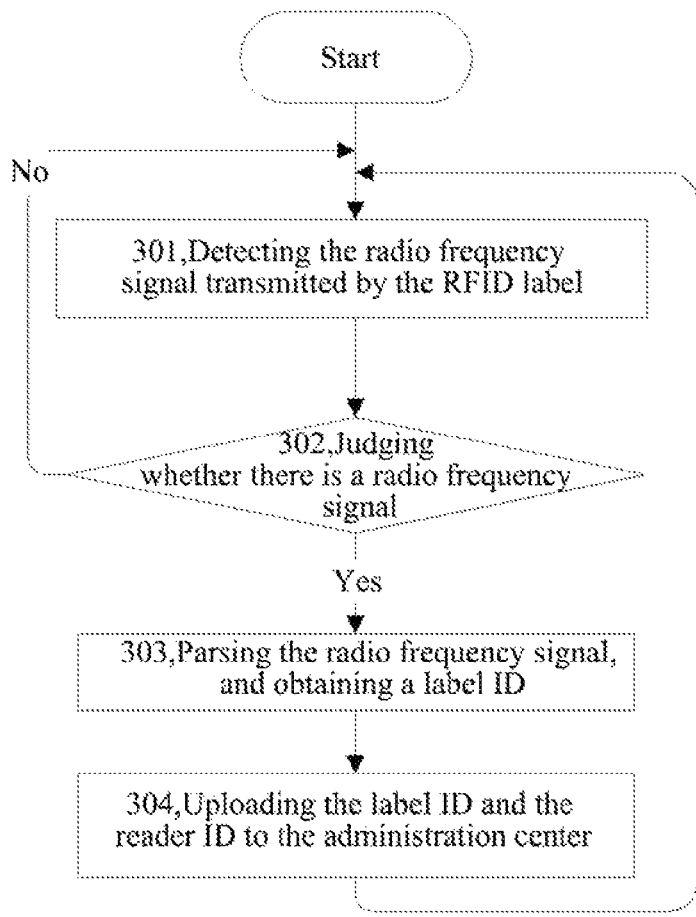
FIG. 3 is a processing flow schematic diagram of an RFID reader according to an embodiment of the present invention.

FIG. 3 shows a processing flowchart of an RFID reader according to an embodiment of the present invention, and as shown in FIG. 3, the processing flowchart is described specifically as follows:

in step 301, the RFID reader detects a radio frequency signal transmitted by the RFID label;

in step 302, it is judged whether there is a radio frequency signal, and if yes, step 303 is executed, if not, step 301 is executed to proceed with the detection;

in step 303, the ID of the RFID label is obtained by parsing the radio signal;

in step 304, the parsed ID of the label and the ID of the RFID reader are reported to the administration center.

Figure 4:
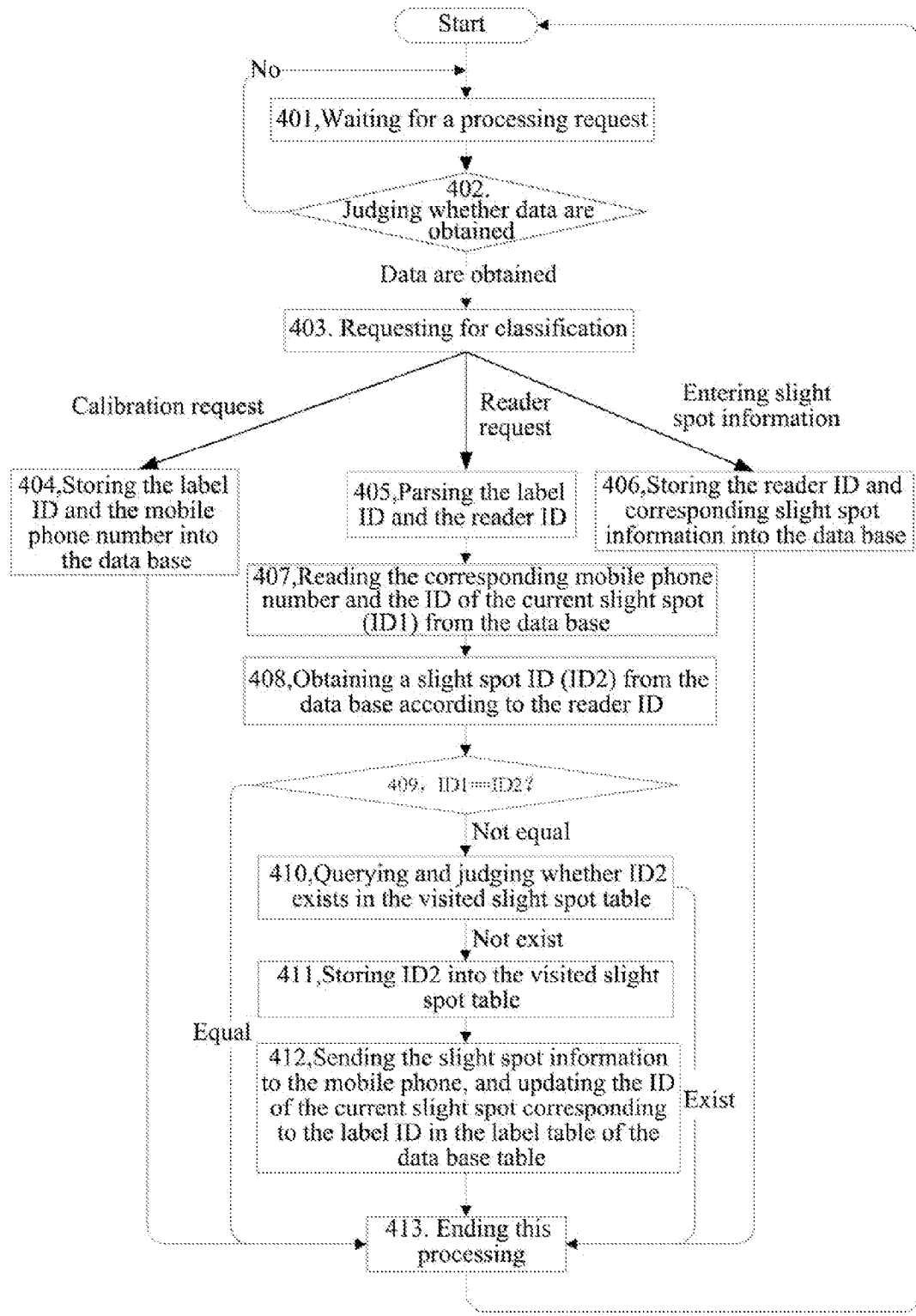
FIG. 4 is a processing flow schematic diagram of an administration center according to an embodiment of the present invention.

FIG. 4 shows a processing flowchart of an administration center according to an embodiment of the present invention, and as shown in FIG. 4, the specific flowchart is specifically described as follows:

in step 401, the administration center starts up and waits, and if there is a processing request, the next step 402 is executed;

in step 402, it is judged whether the data are obtained, if yes, step 403 is executed, or else, step 401 is executed;

in step 403, the obtained data are classified according to the processing request, if the processing request is a calibration request, step 404 is executed, if the processing request is a reader request, step 405 is executed, if the processing request is a sight spot information entering request, step 406 is executed;

in step 404, if the processing request is a calibration request, the label ID and the mobile phone number are stored in the data base, and then step 413 is executed;

in step 405, if the processing request is a reader request, the label ID and the reader ID are parsed, and step 407 is executed;

in step 406, if the processing request is a sight spot information entering request, then the reader ID and the corresponding sight spot description information are stored in the data base, and step 413 is executed;

in step 407, the mobile phone number and the ID of the current sight spot (ID1) are obtained from the data base according to the label ID;

in step 408, the ID of the sight spot (ID2) is obtained from the data base according to the reader ID;

in step 409, it is judged whether the obtained IDs of the above two sight spots are identical, i.e., whether ID1 and ID2 are equal, if not, step 410 is executed, or else, step 413 is executed;

in step 410, it is queried whether the ID2 exists in the table LabelXXX_Viewpoint_Table, if yes, it suggests that the user has been to this sight spot, then step 313 is executed, if not, step 411 is executed;

in step 411, ID2 is stored in the table LabelXXX_Viewpoint_Table, and then the next step 412 is executed;

in step 412, by querying the table ViewPoint_Table according to New_ID, the sight spot description information is obtained from the table and sent to the mobile phone of the tourist; and the ID of the current sight spot corresponding to the label ID in the Label_table is updated, then the next step 413 is executed;

wherein, there is not a certain order for executions of step 412 and step 410.

In step 413, the present processing ends.

An entire processing flowchart executed by an administration center for a processing request is described above, and afterwards, step 401 is executed again for waiting for a next processing request, and then the next processing request will be processed according in the same way as the present processing request.

The above content only shows preferred embodiments of the present invention, which are not used to limit the present invention, and for those skilled in the art, there may be various changes or changes. Any modifications, equivalent alternatives, improvements and the like made within the spirit and principle of the present invention should be included in the protection scope of the present invention. Those of ordinary skill in the art should understand that the whole or part of steps of the above-mentioned method may be implemented by a program through instructing relevant hardware, the program may be stored in a computer readable storage medium such as a read only memory, a disk or a compact disk. Alternatively, the whole or part of steps of the above-mentioned embodiments may also be implemented using one or more integrated circuits. Correspondingly, each module/unit in the above-mentioned embodiments may be implemented in a form of hardware, or may be implemented in a form of software function module. The present invention is not limited to any specific form of the combination of hardware and software.

INDUSTRIAL APPLICABILITY

A hand-held sight spot guiding system is designed by using the RFID technology according to the present invention, to provide sight spot description information for tourists in time, so that the tourists may view the sight spot description information conveniently; the sight spot description information may be updated in real time, and interactions between the sight administration center and tourists may also be implemented; moreover, the administration center may also learn the distribution condition of the tourists in real time by querying a data base, and know the tourists' preferences and concerns for different sight spots according to the distribution condition of the tourists, and take some management measures correspondingly, for example, to set more rest points at the sight spots that catch more attentions, and to reinforce propaganda and construction of the sight spots that have less attentions; in the case that the tourists are too centralized, guiding information may be released in time to avoid excessive centralization of the tourists, and so on.

What is claimed is:

1. A sight spot guiding system, comprising: a radio frequency identification (RFID) chip, an RFID reader and an administration center, wherein the RFID chip is installed in a mobile terminal, the RFID reader is set at each sight spot of a scenery spot, the RFID chip and the RFID reader are both configured with a unique identity identifier (ID);

the RFID chip is configured to: after arriving at the sight spot, receive a radio broadcast signal transmitted by the RFID reader set at the sight spot, and transmit a radio response signal which carries the ID of the RFID chip;

the RFID reader is configured to: after reading the radio response signal transmitted by the RFID chip, report the ID of the RFID chip and the ID of the reader itself to the administration center;

the administration center is configured to: store a corresponding relationship between the ID of the RFID reader and sight spot description information, and a corresponding relationship between the RFID chip and the mobile terminal; after receiving the ID of the RFID chip and the ID of the RFID reader which are reported, send the sight spot description information corresponding to the ID of the RFID reader to the mobile terminal corresponding to the ID of the RFID chip by a mobile communication network;

wherein the administration center is further configured to:
store and maintain a sight spot information table and a reader table respectively, wherein the sight spot information table stores a corresponding relationship between the ID of each sight spot and description information of the sight spot, and the reader table stores a corresponding relationship between the ID of each RFID reader and an ID of the sight spot at which the RFID reader is located;

after receiving the ID of the RFID chip and the ID of the RFID reader that are reported, obtain the ID of the sight spot corresponding to the ID of the RFID reader by querying the reader table, and then obtain the sight spot description information corresponding to the ID of the sight spot by querying the sight spot information table;

wherein the administration center is further configured to:

store and maintain a label table which stores a corresponding relationship between the ID of the RFID chip, a number of the mobile terminal and the ID of the current sight spot; and store and maintain, for each RFID chip, a visited sight spot table which stores the ID of sight spot(s) already visited by the RFID chip;

when receiving the ID of the RFID chip and the ID of the RFID reader that are reported, obtain the ID of the current sight spot corresponding to the ID of the RFID chip by querying the label table, and if the obtained ID of the sight spot corresponding to the ID of the RFID reader is not identical with the ID of the current sight spot corresponding to the ID of the RFID chip, then update the ID of the current sight spot in the label table with the ID of the sight spot corresponding to the ID of the RFID reader, meanwhile query the visited sight spot table to judge whether there is the updated ID of the sight spot, if not, send the sight spot description information corresponding to the updated ID of the sight spot to the mobile terminal corresponding to the RFID chip by querying the sight spot information table, and then record the updated ID of the sight spot into the visited sight spot table.

2. The system according to claim 1, wherein, the system further comprises an RFID calibrator, which is configured to: calibrate the RFID chip and configure a unique ID for each RFID chip, and configure a radio frequency calibration parameter.

3. The system according to claim 1, wherein, the RFID reader connects with the administration center by a wired device or a wireless device, and the RFID reader is configured to: after reading the radio response signal transmitted by the RFID chip, report the ID of the RFID chip and the ID of the RFID reader itself to the administration center by sending a report request to the administration center.

4. A method for implementing sight spot guiding, comprising:

after a mobile terminal equipped with a radio frequency identification (RFID) chip arrives at a sight spot, the mobile terminal receiving a radio broadcast signal transmitted by an RFID reader set at the sight spot, and transmitting a radio response signal which carriers an Identity Identifier (ID) of the current RFID chip;

the RFID reader, after reading the radio response signal transmitted by the RFID chip, reporting the ID of the RFID chip and the ID of the current reader to an administration center; and the administration center, after receiving the reported ID of the RFID chip and the ID of the reader, sending sight spot description information corresponding to the ID of the reader to the mobile terminal corresponding to the ID of the RFID chip by a mobile communication network, according to a stored corresponding relationship between the ID of the RFID reader and the sight spot description information and a stored corresponding relationship between the RFID chip and the mobile terminal;

the method further comprising:

the administration center storing and maintaining a sight spot information table and a reader table respectively, wherein the sight spot information table stores a corresponding relationship between the ID of each sight spot and description information of the sight spot, and the reader table stores a corresponding relationship between the ID of each RFID reader and the ID of the sight spot at which the RFID reader is located;

the administration center, when receiving the ID of the RFID chip and the ID of the RFID reader, obtaining the ID of the sight spot corresponding to the ID of the RFID reader by querying the reader table, and then obtain the sight spot description information corresponding to the ID of the sight spot by querying the sight spot information table;

the method further comprising:

the administration center storing and maintaining a label table which stores a corresponding relationship between the ID of the RFID chip, a number of the mobile terminal and the ID of the current sight spot; and storing and maintaining, for each RFID chip, a visited sight spot table, which stores the ID of sight spot(s) already visited by the RFID chip;

when receiving the ID of the RFID chip and the ID of the RFID reader that are reported, the administration center obtaining the ID of the sight spot corresponding to the ID of the RFID reader by querying the reader table, and obtaining the ID of the current sight spot corresponding to the ID of the RFID chip by querying the label table, and if the obtained two IDs of the sight spot are not identical, then updating the ID of the current sight spot in the label table with the ID of the sight spot corresponding to the ID of the RFID reader, and meanwhile querying the visited sight spot table to judge whether there is the updated ID of the sight spot, if not, sending the sight spot description information corresponding to the updated ID of the sight spot to the mobile terminal corresponding to the RFID chip by querying the sight spot information table, and then recording the updated sight spot ID into the visited sight spot table.

5. The method according to claim 4, wherein, the administration center sends the sight spot description information to the mobile terminal corresponding to the RFID chip by way of a short message or a multimedia message.

6. The method according to claim 4, wherein, in the reader table, the ID of one sight spot corresponds to the ID of one RFID reader or IDs of a plurality of RFID readers.

7. The system according to claim 2, wherein, the RFID reader connects with the administration center by a wired device or a wireless device, and the RFID reader is configured to: after reading the radio response signal transmitted by the RFID chip, report the ID of the RFID chip and the ID of the RFID reader itself to the administration center by sending a report request to the administration center.

* * * * *